UNITED STATES PATENT OFFICE 2,563,707

PROCESS FOR PREPARING PTERIDINES

Donna B. Cosulich, Bound Brook, N. J., assignor to American Cyanamid Company, New York, N. Y., a corporation of Maine No Drawing. Application December 12, 1947, Serial No. 791,462

20 Claims. (Cl. 260—251.5)

This is a continuation-in-part of my application Serial No. 689,821, filed August 10, 1946, now abandoned.

This invention relates to an improvement in the art of preparing pteridines having the general formula

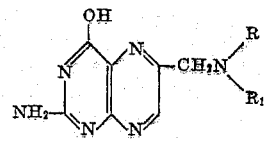

in which R and $R_1$ are hydrogen, aliphatic or aromatic radicals.

Lately, with the successful synthesis of pteroylglutamic acid, the commercial production of this compound and others having a related structure has become of considerable importance. This synthetic product has now been established to be identical or closely related to naturally occurring folic acid or L. casei factor. Practical medical experience has shown that pteroylglutamic acid is an effective therapeutic agent in the treatment of macrocytic anemias, sprue, and other related diseases. Compounds having a somewhat related structure possess anti-folic acid action and are finding important application in experimental medicine. In view of the fact that known methods of synthesizing substances having a pteridine nucleus generally give very low yields, improvements in the process of producing these new therapeutic substances are, therefore, of great importance.

In volume 103 of Science, pp. 667–669, May 31, 1946, there is disclosed a process of preparing pteroylglutamic acid. This synthesis is described in greater detail in the copending application of Waller and Mowat, Serial Number 606,704, filed July 23, 1945, now U. S. Patent 2,500,296, March 14, 1950.

As shown therein, pteroylglutamic acid may be prepared by the reaction of 2,4,5-triamino-6-hydroxypyrimidine, para-aminobenzoylglutamic acid or an ester thereof and a 2,3-dihalopropionaldehyde.

The reaction may be illustrated by the following equation:

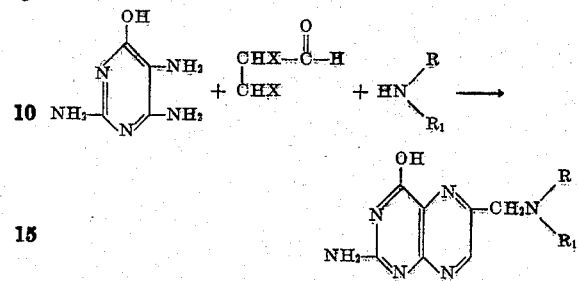

in the above X represents a halogen and $$HN\diagdown{}^R_{R_1}$$

is a primary or secondary amine, R representing hydrogen or an aliphatic or aromatic radical and $R_1$ an aromatic radical. In the preparation of pteroylglutamic acid the amine is p-aminobenzoylglutamic acid or an ester thereof.

The first product of the reaction in which pteroylglutamic acid is formed is believed to have in at least one of its tautomeric forms the formula:

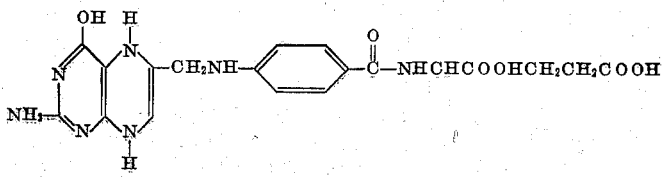

and as such may be named N-[4-{[(2-amino-4-hydroxy-5,8-dihydro-6-pyrimido [4.5-b] pyrazyl) methyl]-amino}-benzoyl] glutamic acid. During the process the product is oxidized so that the -5,8-hydrogens are removed and pteroylglutamic acid having a fused aromatic pyrimido-pyrazyl nucleus is finally obtained as follows:

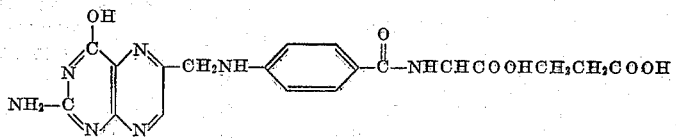

The oxidation of the non-aromatic to the aromatic pyrazyl structure occurs through some obscure mechanism, probably in part through some internal oxidation or disproportionation. The result is that the yields of final product are lower than desired. This has made the synthesis of such compounds disappointing. I have discovered, however, that if oxidizing agents are added to the reaction mixture, considerable improvements in yield are obtained. The improvement in yield may be due to the elimination of the disproportionation reaction, or for some other reason, but this has not been definitely determined to be a fact as yet and I do not wish to be bound by any hypothetical explanation. The fact remains that by use of oxidizing agents an improved yield is obtained in the reaction.

Further investigation of other reactions in which a dihydro pyrimido-pyrazyl ring structure is formed as an intermediate step in the preparation of fused aromatic pyrimido-pyrazyl ring compounds having the general formula shown above has likewise shown that the application of oxidizing agents to the reaction, in accordance with the present invention, leads to improved yields. For example, when reacting vicinal diamino pyrimidines with 2,3-dihaloaldehydes and primary or secondary amines, a fused -5,8-dihydro pyrimido-pyrazyl ring structure is first obtained. When oxidizing agents having an activity within the range $E_0 = -0.49$ to $-1.42$ are included in the reaction mixture or added thereafter, much better yields of the desired aromatic form of the product are obtained.

To illustrate the invention to better advantage the following examples are given. In these, dihydro pyrimido-pyrazyl compounds are prepared and treated with various oxidizing agents. It will be understood, of course, that the invention is not limited to the particulars illustrated and still other oxidizing agents within the range specified above may be employed.

Example 1

21.4 g. 2,4,5-triamino-6-hydroxypyrimidine dihydrochloride and 26.6 g. para-aminobenzoylglutamic acid are slurried in 700 cc. water and warmed to 40° C. After adjusting the pH 2.5-4.0, 21.6 g. 2,3-dibromopropionaldehyde, 12.7 g. iodine in 92 cc. 20% potassium iodide solution, and enough sodium hydroxide to maintain a pH of 2.5-4.0 are added simultaneously over a 20-30 minute period. The slurry is cooled, filtered and washed with water and dried. This solid is crude pteroylglutamic acid. The yield is almost double that of an identical run in which the iodine is omitted.

Example 2

To a solution of 14 g. 2,4,5-triamino-6-hydroxypyrimidine and 15 g. para-aminobenzoylglutamic acid in 800 cc. water at 45° C. and pH 3-4 are added simultaneously dibromopionaldehyde and a solution of 33 g. potassium ferricyanide and 17 g. potassium iodide over a 20-30 minute period. The pH is kept at 3-4 with sodium hydroxide. The yield of crude pterolyglutamic acid is higher than in a run in which no oxidizing agent is used and is the same as a run made using iodine.

Example 3

21.4 g. 2,4,5-triamino-6-hydroxypyrimidine dihydrochloride and 26.6 g. para-aminobenzoylglutamic acid are slurried in 700 cc. water and warmed to 40° C. After adjusting to pH 2.5-4.0, 21.6 g. 2,3-dibromopropionaldehyde, 5 g. potassium bromate in 160 cc. water and enough sodium hydroxide to maintain a pH of 2.5-4.0 are added simultaneously over a 20-30 minute period. The slurry is cooled, filtered, and washed with water and dried. The yield of crude pteroylglutamic acid which results is considerably higher than in an identical experiment in which the potassium bromate is omitted.

Example 4

10.7 g. 2,4,5-triamino-6-hydroxypyrimidine dihydrochloride and 13.3 g. para-aminobenzoylglutamic acid are slurried in 350 cc. water and heated to 40° C. After adjusting to pH 2.5-4.0, 10.8 g. 2,3-dibromopropionaldehyde, 8.3 g. sodium hypoiodite in 50 cc. water, and enough sodium hydroxide to maintain a pH of 2.5-4.0 are added simultaneously over a period of 20-30 minutes. The slurry is cooled, filtered, and washed with water and dried. The yield of crude pteroylglutamic acid which results is somewhat better than in an experiment in which no oxidizing agent is used.

Example 5

21.4 g. 2,4,5-triamino-6-hydroxypyrimidine dihydrochloride and 26.6 g. para-aminobenzoylglutamic acid are slurried in 700 cc. water and heated to 40° C. After adjusting to pH 2.5-4.0, 21.6 g. 2,3-dibromopropionaldehyde, a stream of chlorine gas, and enough sodium hydroxide to maintain the pH at 2.5-4.0 are added simultaneously over a 20-30 minute period. The material is cooled, filtered, washed with water and dried. The yield of crude pterolyglutamic acid is considerably larger than in an experiment in which no chlorine is used.

Example 6

To a solution of 14.1 g. 2,4,5-triamino-6-hydroxypyrimidine and 26.6 g. para-aminobenzoylglutamic acid at pH 2.5-4.0 and 40-45 cc. are added simultaneously 2,3-dibromopropionaldehyde, a solution of 32.9 g. potassium ferricyanide trihydrate, and enough sodium hydroxide to maintain pH 2.5-4.0 over a period of 20-30 minutes. The slurry is cooled, filtered, washed and dried. The yield of crude pterolyglutamic acid is considerably higher than in an experiment made without the addition of potassium ferricyanide.

Example 7

To a solution of 21.4 g. 2,4,5-triamino-6-hydroxypyrimidine dihydrochloride and 26.6 g. para-aminobenzoylglutamic acid at pH 4-5 and 40° C. are added simultaneously 21.6 g. 2,3-dibromopropionaldehyde and 2.16 g. benzoquinone in acetone over a 20-30 minute period. The pH is maintained at 4-5 with sodium hydroxide. After cooling, the pH is adjusted to 3-4 and the mixture filtered, washed and dried. The yield of crude pteroylglutamic acid is higher than in an identical run omitting benzoquinone.

Example 8

This run was made similarly to that of the preceding example except that 34 cc. 10% hydrogen peroxide is added to the reaction simultaneously with the benzoquinone-aldehyde solution. The yield of crude pteroylglutamic acid was somewhat higher than in the run above using benzoquinone alone.

Example 9

To a slurry of 13.3 g. para-aminobenzoylglutamic acid and 7.1 g. 2,4,5-triamino-6-hydroxypyrimidine in 100 cc. ethylene glycol at 30°-35° C. are added simultaneously 10.8 g. 2,3-dibromopropionaldehyde and 4.4 g. manganese dioxide. After stirring 10 minutes, the mixture is drowned into water at 40° C. After cooling to 15° C. the mixture is filtered, washed, and dried. The yield of pterolyglutamic acid is almost double that of an identical run in which the manganese dioxide is omitted.

*Example 10*

To a solution of 21 g. 2,4,5-triamino-6-hydroxypyrimidine dihydrochloride and 26.6 g. para-aminobenzoylglutamic acid in 700 cc. water at 40°–45° C. and pH 3–4, are added simultaneously 21.6 g. 2,3-dibromopropionaldehyde and a solution of 26–30 g. ferric chloride over a 50 minute period. The pH is kept at 3–4 with sodium hydroxide. After cooling, the mixture is filtered, washed, dried, and yields almost double the amount of crude pterolyglutamic acid obtained in an experiment in which no ferric chloride is used.

*Example 11*

To a solution of 14.1 g. 2,4,5-triamino-6-hydroxypyrimidine and 26.6 g. para-aminobenzoylglutamic acid in 700 cc. water at 40° C. and pH 3–4 are added simultaneously 21.6 g. 2,3-dibromopropionaldehyde, a solution of 5 g. sodium dichromate, and enough sodium hydroxide to maintain a pH of 3–4 over a 20–30 minute period. After filtering, washing, and drying, the yield of crude pterolyglutamic acid is higher than when no oxidizing agent is used.

*Example 12*

To prepare crude pteroyl-gamma-glutamyl-gamma-glutamylglutamic acid, 20.6 parts of 2,4,5-triamino-6-hydroxypyrimidine sulfate monohydrate and 21.0 parts barium chloride dihydrate are slurried in 400 parts of water and heated for ten minutes at 60° C. To this slurry is added a solution containing 20.4 parts of gamma-ethyl p - aminobenzoylglutamyl - gamma - glutamyl-gamma-glutamate, and the temperature adjusted to 40° C. The pH is maintained at 2.8 to 3.1 with 5 N. sodium hydroxide during the gradual addition of the dibromopropionaldehyde solution (17.28 parts dibromopropionaldehyde in 17.5 parts glacial acetic acid) and sodium dichromate solution (3.94 parts of sodium dichromate in 40 parts of water) over a 15 to 20 minute period. After completion of the addition, the slurry is stirred for ½ hour at 40°–43° C. The temperature is then lowered to 5° C., and the crude pteroylglutamyl - gamma - glutamyl - gamma - glutamic acid is filtered off.

*Example 13*

To prepare crude pteroylglutamyl-alpha-glutamic acid 12.9 parts of 2,4,5-triamino-6-*hydroxy*pyrimidine sulfate monohydrate and 12.1 parts of barium chloride dihydrate are slurried in 200 parts of water and heated for 10 minutes at 60° C. To this slurry is added a solution containing 9.45 parts of p-aminobenzoylglutamyl-alpha-glutamic acid, and the temperature adjusted to 40° C. The pH is maintained at 2.8 to 3.1 with 5 N. sodium hydroxide during the gradual addition of the dibromopropionaldehyde solution (10.8 parts dibromopropionaldehyde in 10.6 parts of glacial acetic acid) and sodium dichromate solution (2.5 parts sodium dichromate in 25 parts of water) over a 20-minute period. After completion of the addition, the slurry is stirred for ½ hour at 40° C. The temperature is then lowered to 5° C., and the crude pteroylglutamyl-alpha-glutamic acid is filtered off.

*Example 14*

A slurry of 21.4 parts 2,4,5-diamino-6-hydroxypyrimidine sulfate monohydrate and 20.4 parts barium chloride dihydrate in 585 cc. water is heated at 60° C. for 10 minutes. Then 12.6 parts p-(N-methylamino)-benzoic acid is added, and the mixture is cooled to 40° C. After adjustment to pH 3.03, simultaneous addition of 18.3 parts dibromopropionaldehyde in 18.3 parts acetic acid, 10.4 parts iodine and 20.8 parts potassium iodide in 67 parts water, and 5 N. caustic is carried out over 30 minutes. The pH is maintained at 3 by the caustic and the temperature at 40° C. After stirring 10 minutes, the mixture is cooled to 20° C. and the crude $N^{12}$-methylpteroic acid isolated by filtration.

*Example 15*

In 700 parts water are slurried 25.7 parts 2,4,5-triamino-6-hydroxypyrimidine sulfate monohydrate and 24.4 parts barium chloride dihydrate. After heating at 60° C. for 10 minutes, 32.4 parts disodium p - (N-methylamino) - benzoylglutamic acid is added. The mixture is cooled to 40° C. and adjusted to pH 3–4. Then is begun the simultaneous addition of 21.6 parts dibromopropionaldehyde in 21.6 parts acetic acid, 12.5 parts iodine and 25 parts potassium iodide in 100 parts water, and 5 N. caustic to maintain pH 3–4. This addition is continued over 30 minutes at 40° C. After stirring 15 minutes, the mixture is cooled to 20° C., and the crude $N^{12}$-methylpteroylglutamic acid isolated by filtration.

*Example 16*

A slurry of 3.85 parts 2,4,5-triamino-6-hydroxypyrimidine sulfate monohydrate and 3.66 parts barium chloride dihydrate in 70 parts water is heated at 60° C. for 10 minutes and cooled to 40° C. Then 0.755 parts p-(N-ethylamino) benzoic acid is added, and the pH adjusted to 3–4. Simultaneous addition is begun of 2.16 parts dibromopropionaldehyde in 2.16 parts acetic acid, 1.25 parts iodine and 2.5 parts potassium iodide in 8 parts water, and 5 N. caustic to maintain pH 3.5–4.0. The addition which took 20 minutes was followed by a 10 minute stirring period. After cooling to 20° C. the crude $N^{12}$-ethylpteroic acid is isolated by filtration.

*Example 17*

In 700 parts water are slurried 38.5 parts 2,4,5-triamino-6-hydroxypyrimidine sulfate monohydrate and 36.6 parts barium chloride dihydrate. The mixture, after heating at 60° C. for 10 minutes, is treated with 9.7 parts p-(N-butylamino) benzoic acid and adjusted to pH 3.5–4.0. Over a 20 minute period are added simultaneously at 40° C. 21.6 parts dibromopropionaldehyde in 21.6 parts acetic acid, 12.5 parts iodine and 25 parts potassium iodide in 80 parts water, and 5 N. sodium hydroxide to maintain pH 3.5–4.0. After 20 minutes more stirring and cooling to 20° C., the crude $N^{12}$-butylpteroic acid is isolated by filtration.

*Example 18*

This is run exactly as described in the immediately preceding example except that 11.35 parts p-(N-benzylamino) benzoic acid is used in place of the corresponding butyl compound. $N^{12}$-benzylpteroic acid is obtained.

Example 19

A slurry of 12.9 parts 2,4,5-triamino-6-hydroxypyrimidine sulfate monohydrate and 12.2 parts barium chloride dihydrate in 350 parts water is heated to 60° C. for 10 minutes, cooled to 40° C., treated with 7.6 parts o-(N-methylamino) benzoic acid (N-methylanthranilic acid), and adjusted to pH 3.5–4.0. Over a 20 minute period are added simultaneously 10.3 parts dibromopropionaldehyde in 10.3 parts acetic acid, 6.2 parts iodine and 12.5 parts potassium iodide in 40 parts water, and 5 N. sodium hydroxide to maintain pH 3.5–4.0. After stirring 10 minutes longer and cooling to 20° C., the crude $N^{12}$-methyl "ortho" pteroic acid is isolated by filtration.

Example 20

A slurry of 12.9 parts 2,4,5-triamino-6-hydroxypyrimidine sulfate monohydrate and 12.2 parts barium chloride dihydrate is heated at 60° C. for 10 minutes, treated with meta-aminobenzoic acid, cooled to 40° C. and adjusted to pH 3.5–4.0. Then over a 20 minute period are added simultaneously 10.3 parts dibromopropionaldehyde in 10.3 parts acetic acid, 6.25 parts iodine and 12.5 parts potassium iodide in 40 parts water, and 5 N. sodium hydroxide to maintain pH 3.5–4.0. After stirring 10 minutes longer and cooling to 20° C., the crude "meta-pteroic acid" is isolated by filtration.

Example 21

A mixture of 25.7 g. 2,4,5-triamino-6-hydroxypyrimidine sulfate monohydrate, 24.4 g. barium chloride dihydrate, and 700 cc. water is heated at 60° C. for 10 minutes. After cooling to 40° C., 21.3 g. of p-phenylaminobenzoic acid is added, and the pH of the mixture adjusted to 3–4. At 40° C. simultaneously are added a solution of 0.1 mol of 2,3-dibromopropionaldehyde in acetic acid, a solution of 12.8 g. iodine and 25 g. potassium iodide in 80 cc. water, and 50% caustic to maintain pH 3–4. The crude $N^{12}$-phenylpteroic acid is isolated by filtration and shows antagonist activity against pteroylglutamic acid.

As will be apparent from the foregoing examples, a large number and variety of oxidizing agents may be used in the process. Those oxidizing agents which have proven useful in the process are those having oxidation-reduction potentials of from about −0.49 to −1.42 volts.

As will also be apparent, the oxidizing agent may be present in the reaction mixture with the intermediates from which the dihydropteridine is formed, it may be added after the reaction, or it may be formed in situ during the course of the reaction, as required. The amount of oxidizing agent can be easily calculated from theoretical considerations.

Of course, the temperature and pH of the reaction mixture will vary according to the method by which the dihydropteridine is formed.

I claim:

1. A method of preparing compounds of the general formula

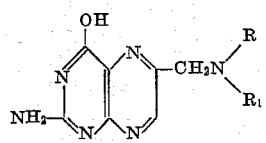

in which R is a member of the group consisting of hydrogen, aliphatic and aromatic radicals, and $R_1$ is an aromatic radical, which comprises treating a reaction mixture comprising 2,4,5-triamino-6-hydroxypyrimidine, a 2,3-dihalopropionaldehyde and a member of the group consisting of primary and secondary amines with an oxidizing agent having an oxidation-reduction potential of $E_0=$ −0.49 to −1.42 volts, and thereafter recovering the said product.

2. A process in accordance with claim 1 in which the amine is p-aminobenzoylglutamic acid.

3. A process in accordance with claim 1 in which the amine is a glutamic acid amide of p-aminobenzoylglutamic acid having at least one peptide linkage.

4. A process in accordance with claim 1 in which the amine is p-aminobenzoylglutamylglutamylglutamic acid.

5. A process in accordance with claim 1 in which the amine is p-[N-methylamino] benzoic acid.

6. A process in accordance with claim 1 in which the dihalopropionaldehyde is 2,3-dibromopropionaldehyde.

7. A process in accordance with claim 1 in which the 2,4,5-triamino-6-hydroxypyrimidine is added in the form of an acid salt.

8. A process in accordance with claim 1 in which the oxidizing agent is iodine.

9. A process in accordance with claim 1 in which the oxidizing agent is an alkali metal dichromate.

10. A process in accordance with claim 1 in which the oxidizing agent is ferric chloride.

11. A process in accordance with claim 1 in which the oxidizing agent is added after reaction of the 2,4,5-triamino-6-hydroxypyrimidine, the 2,3-dihalopropionaldehyde, and the amine.

12. A process in accordance with claim 1 in which the reaction is conducted at a pH within the range of about 2 to 5.

13. An improvement in the preparation of compounds having the general formula

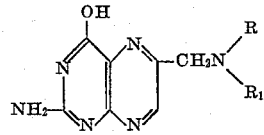

in which R is a member of the group consisting of hydrogen, aliphatic and aromatic radicals and $R_1$ is an aromatic radical from those having the -5,8-dihydro structure

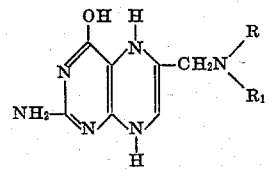

which comprises subjecting the latter to the action of an oxidizing agent having an oxidation-reduction potential within the range $E_0=$ −0.49 to −1.42 volts and thereafter recovering the said product.

14. A process in accordance with claim 13 in which the oxidizing agent is iodine.

15. A process in accordance with claim 13 in which the oxidizing agent is alkali metal dichromate.

16. A process in accordance with claim 13 in which the oxidizing agent is ferric chloride.

17. A method of preparing pteroylglutamic acid which comprises the steps of reacting together 2,5,6-triamino-4-hydroxypyrimidine, a 2,3-dihalopropionaldehyde and para-aminobenzoylglutamic acid in the presence of an oxidizing agent having an oxidation-reduction potential within the range $E_0= -0.49$ to $-1.42$.

18. A method of preparing pteroylglutamic acid which comprises the steps of reacting together 2,5,6-triamino-4-hydroxypyrimidine, 2,3-dibromopropionaldehyde and para-aminobenzoylglutamic acid in the presence of iodine.

19. A method of preparing pteroylglutamic acid which comprises the steps of reacting together 2,5,6-triamino-4-hydroxypyrimidine, 2,3-dibromopropionaldehyde and para-aminobenzoylglutamic acid in the presence of an alkali metal dichromate.

20. A method of preparing pteroylglutamic acid which comprises the steps of reacting together 2,5,6-triamino-4-hydroxypyrimidine, 2,3-dibromopropionaldehyde and para-aminobenzoylglutamic acid in the presence of ferric chloride.

DONNA B. COSULICH.

REFERENCES CITED

The following references are of record in the file of this patent:

UNITED STATES PATENTS

| Number | Name | Date |
| --- | --- | --- |
| 2,500,296 | Waller et al. | Mar. 14, 1950 |

OTHER REFERENCES

Hodgeman et al.: Handbook of Chemistry and Physics, 24th edition, pp. 1380–1381 (1940) (Chemical Rubber Publishing Co., 1900 West 112th St., Cleveland, Ohio).

Angier et al.: Science, 103, 667–669 (1946).